(12) United States Patent
Plaxton et al.

(10) Patent No.: US 7,080,373 B2
(45) Date of Patent: Jul. 18, 2006

(54) METHOD AND DEVICE FOR CREATING AND USING PRE-INTERNALIZED PROGRAM FILES

(75) Inventors: Iris M. Plaxton, Cambridge, MA (US); Samuel J. Rauch, Austin, TX (US); John H. Osman, Cedar Park, TX (US); Andrew A. Bjorksten, Austin, TX (US); Jason M. Bennett, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 950 days.

(21) Appl. No.: 09/800,935

(22) Filed: Mar. 7, 2001

(65) Prior Publication Data

US 2002/0129078 A1    Sep. 12, 2002

(51) Int. Cl.
*G06F 9/455* (2006.01)
*G06F 12/00* (2006.01)
(52) U.S. Cl. .............................. 718/1; 711/6
(58) Field of Classification Search ............ 718/1, 718/100–108; 711/6, 203; 345/568
See application file for complete search history.

(56) References Cited

U.S. PATENT DOCUMENTS

| | | | | |
|---|---|---|---|---|
| 4,695,950 A | * | 9/1987 | Brandt et al. | 711/207 |
| 5,925,123 A | * | 7/1999 | Tremblay et al. | 712/212 |
| 6,272,674 B1 | * | 8/2001 | Holiday, Jr. | 717/174 |
| 6,400,996 B1 | * | 6/2002 | Hoffberg et al. | 700/83 |
| 6,470,494 B1 | * | 10/2002 | Chan et al. | 717/166 |
| 6,606,743 B1 | * | 8/2003 | Raz et al. | 717/148 |
| 6,658,492 B1 | * | 12/2003 | Kawahara et al. | 719/332 |
| 6,763,397 B1 | * | 7/2004 | Bracha et al. | 719/332 |

* cited by examiner

*Primary Examiner*—Meng-Al T. An
*Assistant Examiner*—Kenneth Tang
(74) *Attorney, Agent, or Firm*—Robert I. King (57) ABSTRACT

A device (45) receives new program files (46) and uses pre-internalized images to avoid having to internalize a program file every time that program execution occurs. In one embodiment, a software Virtual Machine (50) in the device functions to implement the pre-internalization. Once the program files are pre-internalized to create images that are stored in a permanent memory (56) of the device, the images may subsequently be executed without having to perform a pre-internalization operation. Additionally, use of dynamic memory (52) is reduced in connection with subsequent program execution and execution time of new program files is reduced.

15 Claims, 8 Drawing Sheets

METHOD AND DEVICE FOR CREATING AND USING PRE-INTERNALIZED PROGRAM FILES

CROSS-REFERENCE TO RELATED APPLICATION

This application is related to pending U.S. patent application Ser. No. 09/507,910 by Iris Plaxton entitled "Method For Processing Program Files" and assigned to the assignee hereof.

FIELD OF THE INVENTION

This invention relates generally to processing of program files written in a high-level language, and specifically to program files written in a high-level programming language capable of dynamic loading.

RELATED ART

As the number and type of hand-held and other electronic devices increases, there is a corresponding increase in the applications that run on and interface with these devices, as well as an increase in the desired flexibility for the user to add special programs and functionality. These devices are sometimes referred to as "embedded devices," as they include a processor for executing instructions, special function units, and the instructions for providing the desired functionality. Embedded devices are typically stand alone devices, having their own power supply, but often include the capability to interface with other systems. For example, embedded devices such as cellular phones, pagers, and personal digital assistants (PDAs) typically include a central processing unit (CPU) for executing computer programs stored within the device and a battery allowing mobility. Subsequent to manufacture of an embedded device, individual users may desire to customize their device by adding special functionality or applications. It is desirable to use computer programs, or codes, written in a high-level programming language, such as Java™, a language developed by Sun Microsystems, Inc., which facilitates the later installation of user-supplied applications. Java is particularly attractive, as it is platform-independent, meaning that it is not specific to one operating system or hardware configuration.

One constraint in developing code for an embedded device is the limited amount of memory, which reduces the amount of code that a device is able to store and also impacts the computing capabilities of the device. A key goal in designing code for an embedded device is then to maximize the memory efficiency and speed of installed applications. Currently, several methods of increasing the memory efficiency of embedded applications exist, however, these methods do not generally extend to the subsequent installation of additional applications by the user.

Java in particular, is an object-oriented programming language that is portable, easy to program, and architecture-neutral. Object-oriented design focuses on the data, referred to as "objects," as well as the interfaces to the objects. The Java program is able to execute anywhere within a network including a variety of processing units and operating system architectures.

Java programs are both compiled and interpreted. Compilation is done once, where compiled Java programming code is referred to as "Java ByteCode" (JBC). The JBC is an intermediate language that is architecture-neutral or platform-independent. A Java interpreter parses and runs JBC instructions on a processor. Interpretation occurs each time the program is executed. A Java binary file, referred to as a class file, includes the JBC for a given program as well as supporting information, such as symbolic data. A class file, or program file, includes "items" or information about the class, such as fields, methods, JBC arrays, and a symbolic reference table. Specifically, a Java program is composed of one or more Java files, which, on compilation, produce one or a set of class files.

JBC is effectively the machine code instructions for a "Java Virtual Machine" (Java VM). Every Java interpreter, such as a Java development environment or a Java-capable web browser, uses an implementation of the Java VM. Often, these tools will either use the Java VM already installed on a system, or may come bundled with a Java VM. Note that the Java VM may also be implemented in hardware. In this way, the program may be compiled on any machine with a Java compiler and the resulting JBC may run on any implementation of the Java VM.

In order to make applications written in Java portable, much symbolic information is maintained. During normal Java VM execution of the JBC, the symbolic data is used by the Java VM to perform the dynamic binding whereby the actual pointer to the referenced structure is obtained. For example, each reference to a function is represented by the symbolic information: class name; function name; and signature. The class name identifies the class object containing the declaration of the method. The methods identify the various functions available for that class, and the JBC arrays are programs executed to implement a method. The function name, together with the signature, identifies the given function within its class. The signature describes the member and type of arguments passed to and returned by a function. The symbolic information expands the size of the Java binary file and that expansion creates memory storage problems. During execution, two (2) copies of the JBC and the symbolic information are maintained: a first copy is stored in permanent memory; and a second copy is stored in dynamic memory in a format easily manipulated by the Java VM. For small, embedded devices, such as pagers, cellular phones, and PDAs, dynamic memory is very limited. It is, therefore, desirable to reduce dynamic memory usage. An additional problem is latency during execution due to the use of costly table lookups for handling symbolic references.

To address some of these problems, tools allow for compacting and formatting of Java class files to more efficiently use memory. "Pre-internalization" is a process of reformatting Java class file information into a format that, when placed in memory, represents a class object. Internalization occurs during loading of a class file and is the process of extracting the class information from a class file and storing the information in structure(s) in dynamic memory. The pre-internalization process eliminates symbolic references and class loading, reducing dynamic memory storage requirements and speeding up execution of the application. The format of the pre-internalized file is specific to each Java VM implementation.

Pre-internalization occurs after compilation but prior to normal loading and execution of the JBC. Pre-internalized class objects are restructured to eliminate the need to store them in dynamic memory, and can therefore be maintained in permanent memory. This frees more of the dynamic memory for creation of dynamic objects during execution. Information and structures used to maintain state, as well as dynamic objects, are stored in what is referred to as the "Java heap". A problem exists with pre-internalization as storing class information in permanent memory eliminates the ability to update this information during execution.

Current solutions avoid storing the symbolic information in dynamic memory by requiring that all symbolic references be resolved prior to class installation on the target device. Resolving references involves replacing the reference with the location of the referenced item, i.e. an address. A problem exists in pre-internalizing a set of class files, or "class file unit," where a reference is made to classes already installed on the device and for which the location of the referenced item is either unknown or unreliable. To avoid duplicating the referenced class information, the installed classes are removed from the device and repackaged with the set of new files.

Figure 1:
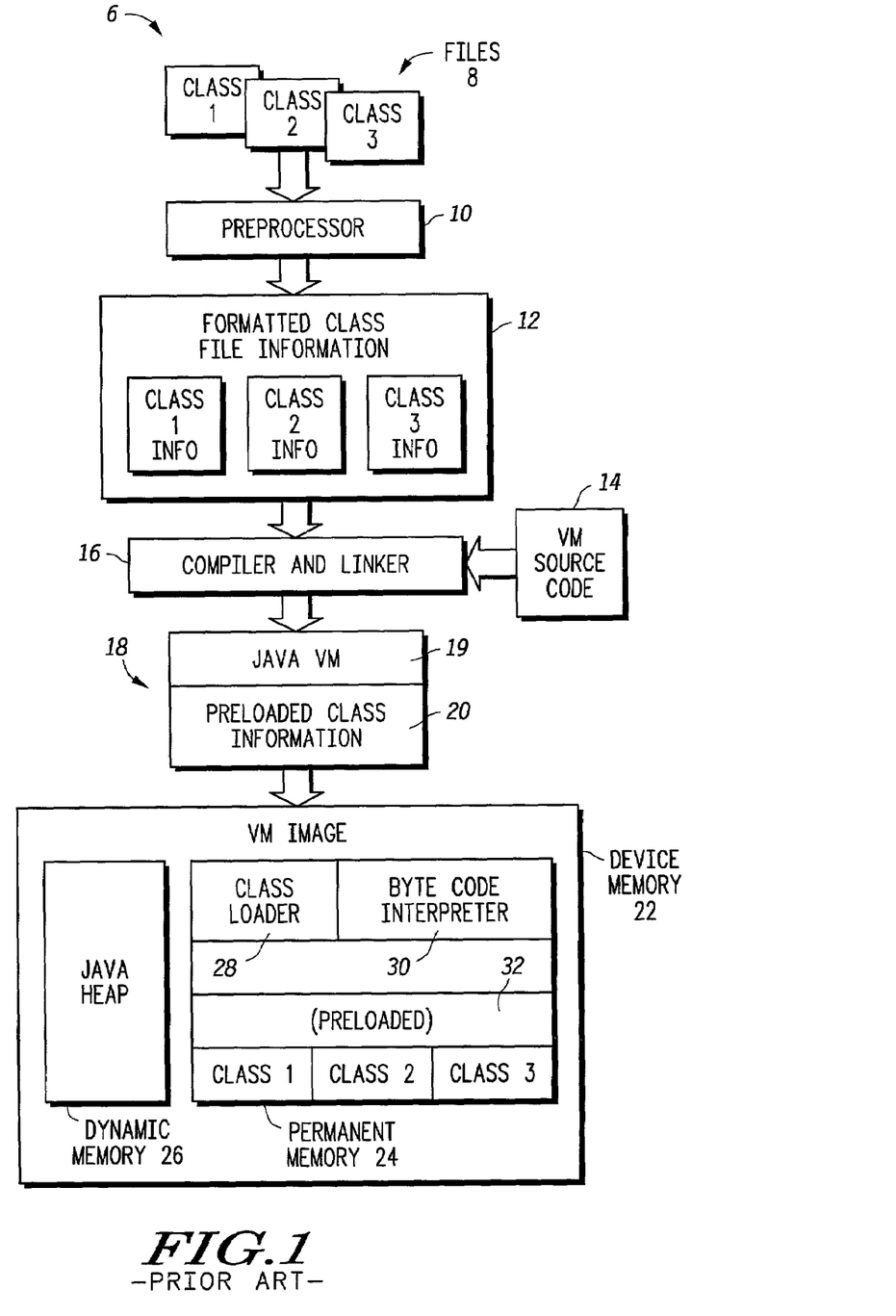
FIG. 1 illustrates in block diagram form a known method of processing program files for permanent storage in a device memory.

FIG. 1 illustrates a prior art process 6 of processing program files, also referred to as class files. Program files 8, labeled "Class 1," "Class 2," and "Class 3," are loaded by preprocessor 10. Preprocessor 10 generates formatted class file information 12. The formatting converts each program file, Class 1, Class 2, and Class 3, to class objects for use during execution, where the class objects are specific to the JVM implementation used. Preprocessor 10 is a tool that may be implemented in software or hardware. The formatted class file information 12 is structured for storage in a target device, where the device has both dynamic and permanent memory. The compiler and linker 16 combines the formatted class file information 12 with the Java VM source code 14. The Java VM source code 14 is specific to the Java VM implemented in the target device. The output of the compiler and linker 16 is the Java VM image 18, which has two portions: a first portion stores the Java VM 19; and a second portion stores preloaded class information 20. The preloaded class information 20 is the compiled version of the formatted class file information.

At this point, the Java VM image 18 is stored in device memory 22 of the target device. In this case, the device memory 22 includes dynamic memory 26, and permanent memory 24. In one embodiment, the dynamic memory 26 is implemented with RAM and the permanent memory 24 is implemented with ROM and/or Flash memory. The dynamic memory 26 is used during execution for storing interim values and variables. The permanent memory 24 includes multiple portions: a first portion 28 for storing a class loader; a second portion 30 for storing a JBC interpreter; and a third portion 32 for storing the preloaded class information 20. The class loader of portion 28 is used for formatting binary class information for use by the Java VM, and is not required for preloaded class information 20, as they were formatted during preprocessing and compilation. The Java VM image 18 stored in the device memory 22 is used to run the Java program files, Class 1, Class 2, Class 3 in program files 8. The device memory 22 is then implemented within a device, such as a hand-held device or other application.

It is often desirable to delete program files from the permanent memory 24 after a manufacturer has performed process 6. Unfortunately, once class files 8 have been stored in the permanent memory 24, a user may not remove the stored program files without assistance from the manufacturer of the device. That assistance takes the form of either returning the device back to the manufacturer or receiving all the tools associated with process 6 from the manufacturer. Manufacturers are reluctant to release or license such proprietary tools to users.

Furthermore, it is often desirable to add additional program files to the Java VM image in the device memory 22. Often the program files 8 describe basic functionality for an application, but the user is free to add supplemental functionality, such as user-specified or application-specific additions that enhance the device. There are several ways to add program files. In a first known process, the process 6 is performed again with the additional program files included with the program files 8. The resultant Java VM image 18 then includes the preloaded class information for all the program files, those in program files 8 plus the additional ones. This method is not flexible as the method requires either the user to return to the manufacturer to have the new program files included in the processing, or the method requires the manufacturer to provide the program files 8 to the user and allow the user to perform the processing. According to a second prior art method, illustrated in FIG. 2, additional program files 42, including program files labeled "Class 4, "Class 5," and "Class 6," are stored in additional permanent memory 40, such as Flash memory. The program files 42 are then loaded by the class loader stored in portion 28 of permanent memory 24 into dynamic memory 26 on execution. The need to store the loaded program files, Class 4, Class 5, and Class 6, in dynamic memory 26 reduces the space available for the Java heap. The loss of dynamic memory space creates a situation where even if all the additional program files 42 are stored in dynamic memory 26, the remaining available dynamic memory space is insufficient to store variables during execution, i.e. the program cannot execute. Since dynamic memory space is typically limited, maximizing the amount of space available for the Java heap is crucial in many applications.

Figure 2:
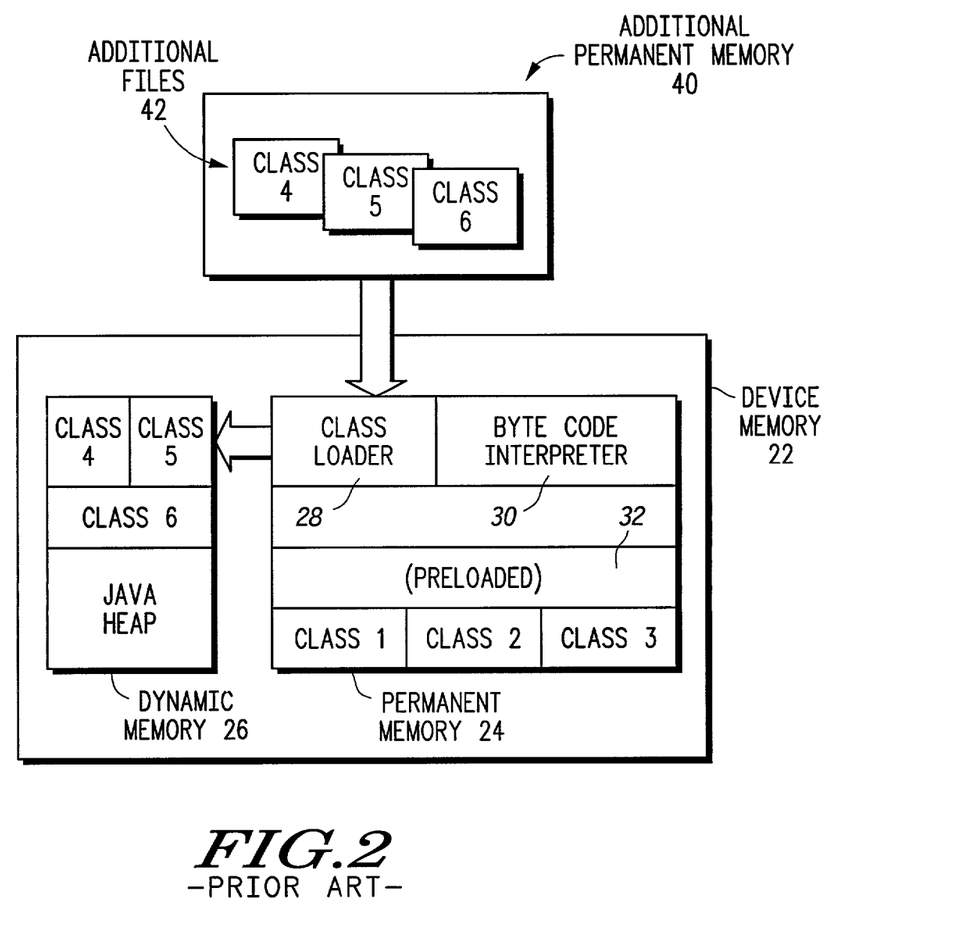
FIG. 2 illustrates in block diagram form a known method of adding application-specific program files to a device memory as in FIG. 1.

Furthermore, the need to class load or internalize the additional program files 42 must be performed on every execution of the additional program files. In other words, the program files are not permanently internalized. Such applications are sometimes referred to as "transient applications." The repetitive internalization significantly slows execution of the program. It should also be noted that this process of internalization by a run time loader is not specific to the Java programming environment.

BRIEF DESCRIPTION OF THE DRAWINGS

The present invention is illustrated by way of example and not limited to the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

For ease of illustration, the Java programming language serves as an exemplar; however, the present invention is applicable to other programming languages as well. Several terms will be used herein with reference to a system having embedded Java program(s). Memory refers to Read Only Memory (ROM), writable memory, and readable-writable memory. Readable-writable memory may be Random Access Memory (RAM), Electrically-Erasable-Programmable Memory (EEPROM), Programmable Memory (PROM), including both One-Time PROM (OTPROM) and Erasable PROM (EPROM), Flash Memory, etc. The term "dynamic memory" is used to refer to memory that is dynamically allocated and does not retain stored information or data when power is removed from the device, such as RAM. The term "permanent memory" is used to refer to memory that is treated as read-only during execution, and retains stored information or data when power is removed from the device, such as ROM.

The present invention provides a method or process for creating and using pre-internalized program files written in a high level-language capable of dynamic loading. As used herein, the terms 'method' and 'process' are intended to be synonymous. A need exists for a method of processing program files that allows for the addition or removal of user-specific program files to improve subsequent execution speed of the additional program files without reducing the amount of dynamic memory available for execution.

Figure 3:
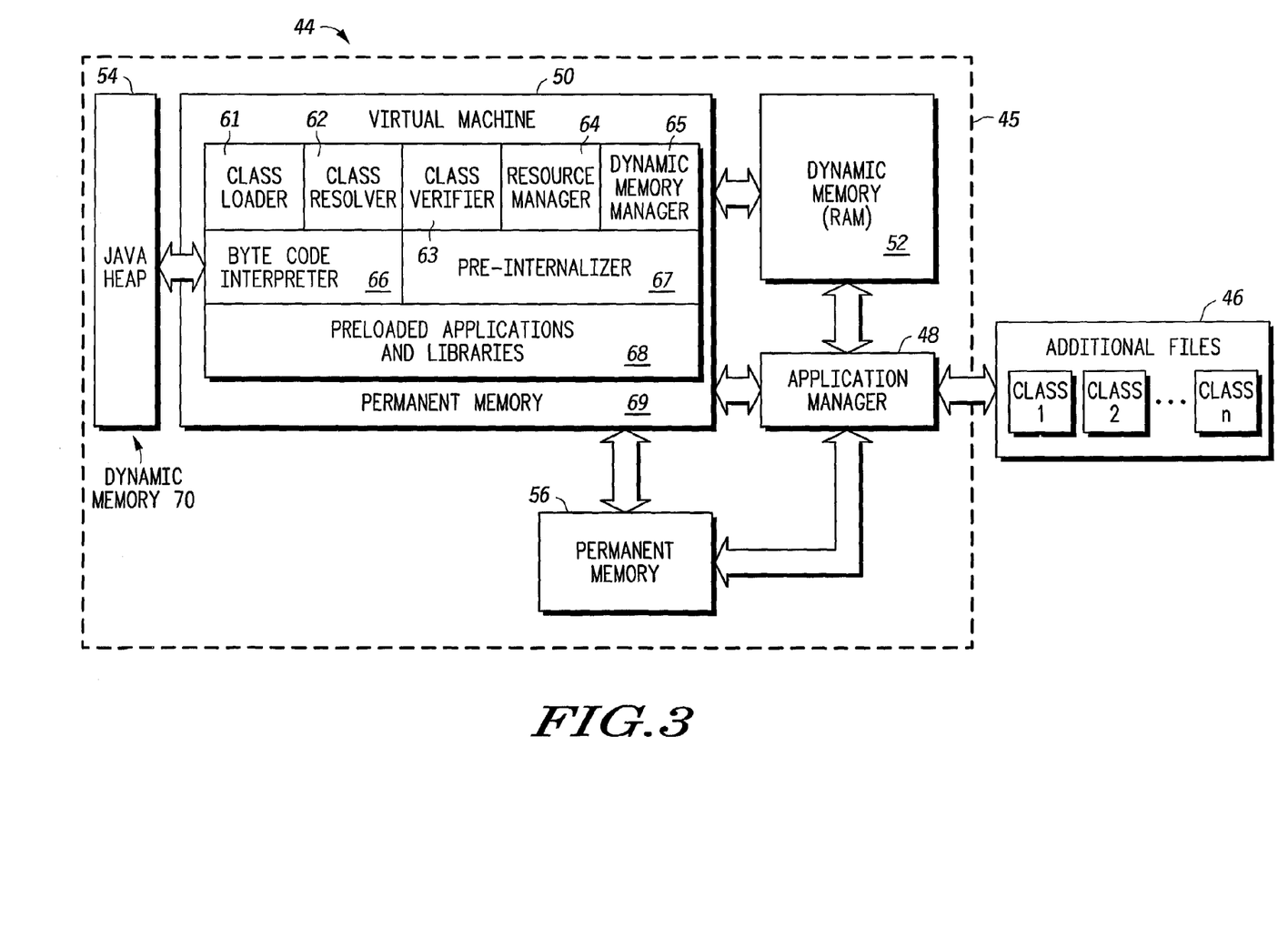
FIG. 3 illustrates in block diagram form a portable device for receiving a program file and creating an executable image of the program file in accordance with the present invention.

Illustrated in FIG. 3 is an exemplary programming environment 44 having a device 45 and additional program files 46 having an arbitrary number of n class files, where n is an integer. Each class file is of arbitrary size and represents one of a collective set of program files that a user desires to add to device 45. It should be understood that the original manufacturer of device 45 did not program device 45 with the illustrated additional program files 46.

Device 45 is coupled to the additional program files 46 via an application manager 48. Bi-directionally coupled to application manager 48 is a dynamic memory 52, a permanent memory 56 and a Virtual Machine (VM) 50. One form of dynamic memory 52 is a random access memory (RAM), and permanent memory 56 may be implemented as a Flash memory. Permanent memory 56 stores the pre-internalized image of additional files 46. In the illustrated form, Virtual Machine 50 is separately coupled to each of dynamic memory 52 and permanent memory 56. It should be well understood that information is transferred within device 45 between dynamic memory 52 and permanent memory 56 via conductors that are not illustrated in response to the Virtual Machine 50. In the illustrated form, Virtual Machine 50 has a class loader 61, a class resolver 62, a class verifier 63, a resource manager 64, a dynamic memory manager 65, a byte code interpreter 66, a pre-internalizer 67, and a plurality of preloaded applications and libraries 68 all of which reside in permanent memory 69. The Virtual Machine 50 also has a Java Heap 54 that resides in dynamic memory 70.

In operation, device 45 was originally programmed by a manufacturer to have predetermined program files that are contained within the preloaded applications and libraries 68. When such preloaded applications are executed, the Virtual Machine 50 executes in a first or normal mode and processes the applications out of its permanent memory 69. Assume however that a user of device 45 desires to add additional files 46 from any source external to the device 45. The application manager 48 functions to assist with placement of the additional files 46 in either dynamic memory 52 or permanent memory 56. The choice of which memory is used is application specific and not germane to the present invention. Application manager 48 starts Virtual Machine 50 in a second or pre-internalization mode that will pre-internalize the program files into the Virtual Machine's native memory structure. For purposes of clarification, the term 'native memory structure' used herein shall mean that the operation is specific to the particular Virtual Machine being discussed as opposed to any other Virtual Machine. A native memory structure refers to a particular Virtual Machine where that Virtual Machine is a particular instantiation of that Virtual Machine on the device. The result of the pre-internalization mode is a pre-internalized image of the program files that is then stored in permanent memory 56. This pre-internalized image is a reusable executable image since the pre-internalized image is now resident in permanent memory, and, should the newly introduced application need to be executed subsequently, the pre-internalization does not need to be repeated. Furthermore, the original copy of the additional files 46 placed into dynamic memory 52 or permanent memory 56 can now be deleted, resulting in significant memory savings.

The Virtual Machine 50 is a standard virtual machine that has been modified in order to be able to perform the pre-internalization function. Prior virtual machines do not perform pre-internalization. The class loader 61 and class resolver 62 have been modified to execute in either normal mode or pre-internalization mode. Furthermore, the class loader 61 has been extended to recognize pre-internalized classes. The byte code interpreter 66 has been extended to support new byte codes created by the pre-internalizer 67.

For purposes of clarity, the process of pre-internalization involves the processing of class files. Initially classes are brought into the Virtual Machine 50 by the class loader 61. Class loader 61 creates Virtual Machine-specific data structures associated with each and every class of the additional program files 46. In normal mode, classes are loaded by the class loader 61 as determined by application usage. During pre-internalization, the Virtual Machine-specific data structures are scanned to determine what other classes, either internal or external to the additional files, are referenced during execution of the additional classes. In normal mode, class initialization methods may need to be executed during class loading, hence requiring the invocation of the byte code interpreter 66. Byte code interpreter 66 performs any initialization that is specific to a predetermined class. Such classes include, for example, static initializers. During pre-internalization for the purposes of installation, execution of the static initializers is not performed. Execution of the static initializers only occurs if the application is being executed. The class resolver 62 of Virtual Machine 50 is used to resolve entries in each class's constant pool in a conventional manner consistent with the published Java reference platform. Upon completion of the resolution, the Java Byte-Code (JBC) are updated to point to the now resolved references (via address pointers). Furthermore, the classes are verified in a conventional manner by the class verifier 63 of Virtual Machine 50 during pre-internalization. The verification of classes is eliminated for future execution of the additional files. Verification is a conventional function in the Java programming language and further discussion of the verification will not be provided. The resource manager 64 stores the resources associated with the additional files in a manner so that the resources are associated with the additional program files. The dynamic memory manager 65 is used throughout the process to create the data structures associated with the class in dynamic memory. The resultant data structures collectively are referred to as an internalized image. The final image is then written to permanent memory 56. In summary, the pre-internalizer 67 is a thin piece of code that directs the components of Virtual Machine 50 to perform these pre-internalization steps.

Figure 4:
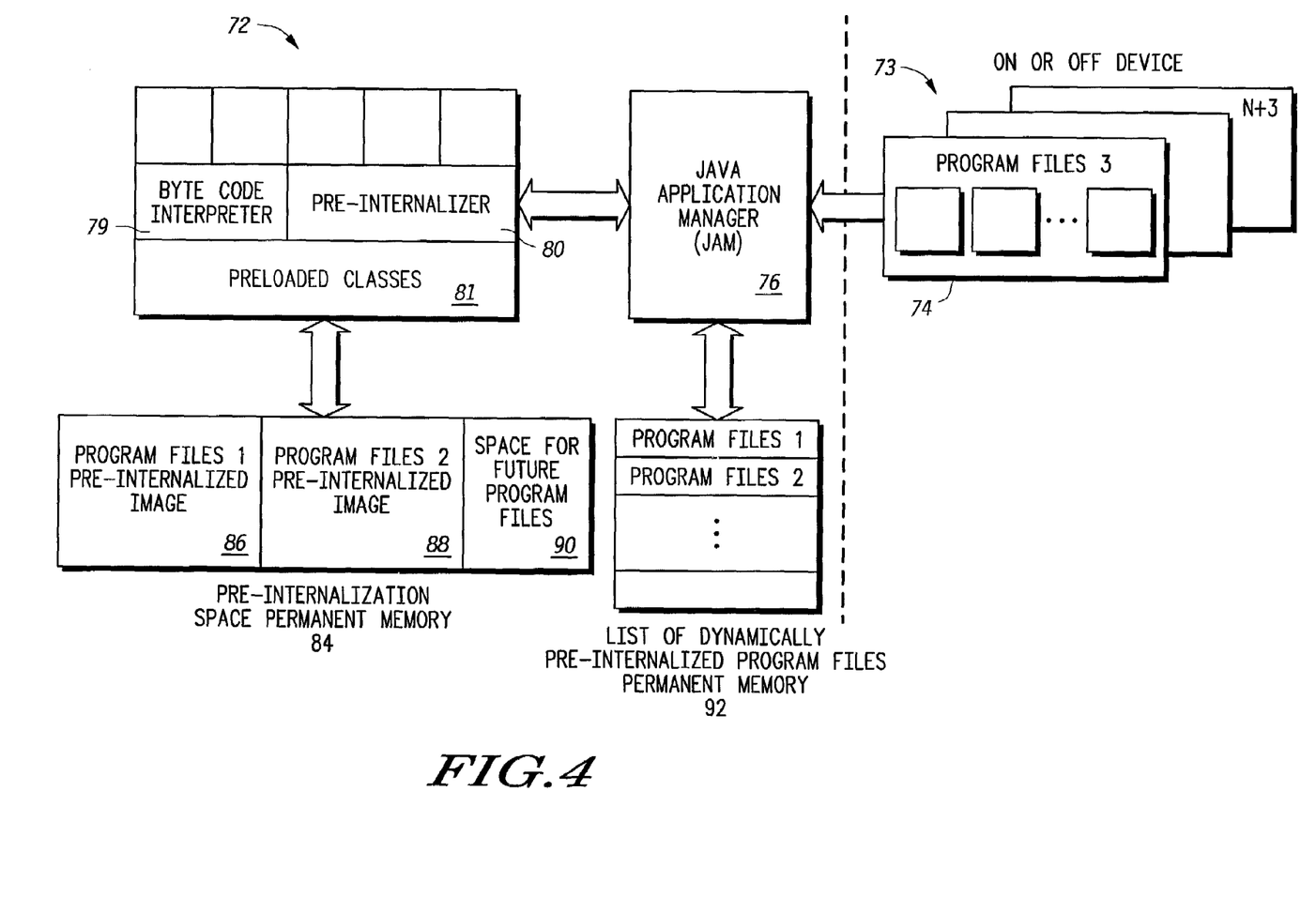
FIG. 4 illustrates in block diagram form details of the program file memory structure of the portable device of FIG. 3.

Illustrated in FIG. 4 is a further detail of the permanent memory of FIG. 3 after the pre-internalization of two program files. A plurality of program files 73, including a third set of program files 74, is coupled to a Java Application Manager (JAM) 76. The JAM 76 maintains a list of dynamically pre-internalized applications in a permanent memory 92. The pre-internalized applications are referred to as being "dynamic" in the sense that the applications are added to the Virtual Machine after manufacturing and sale of the Virtual Machine has occurred.

The JAM 76 is connected to a Virtual Machine 72 having the same components as Virtual Machine 50 of FIG. 3. For convenience of illustration, not all components of a virtual machine are expressly detailed in FIG. 4. The Virtual Machine 72 has a byte code interpreter 79 for use when the VM is in a first or normal mode of execution, a pre-internalizer 80 for use when the VM is in a second or pre-internalization mode of execution, and preloaded classes 81 of program files. The Virtual Machine 72 is coupled to a permanent memory 84 containing a pre-internalized image 86 of a first set of program files, a pre-internalized image 88 of a second set of program files, and space for future program files 90.

In operation, the JAM 76 directs the Virtual Machine 72 to execute preloaded classes 81 and/or pre-internalized image 86 and/or pre-internalized image 88 when operating in the first or normal mode primarily using its byte code interpreter 79. Jam 76 directs Virtual Machine 72 to pre-internalize the third set of program files 74 by primarily using its pre-internalizer 80. Pre-internalizer 80 functions to implement the pre-internalization of the third set of program files 74 in a same manner as described in connection with pre-internalizer 67 of FIG. 3. Pre-internalizer 80 creates an image for the third set of program files 74 that is then stored in the space for future program files 90. Additionally, the Jam 76 directs Virtual machine 72 to remove the second set of program files 88 from the permanent memory 84. Jam 76 maintains knowledge of pre-internalized images through the use of a list of dynamically pre-internalized applications kept in permanent memory 92. Before pre-internalizing a set of program files, the Jam 76 obtains the amount of space for future program files 90 from the Virtual Machine 72 operating in the second mode. This assists the JAM 76 in determining if a program file set can be pre-internalized. The Virtual Machine 72 operating in the second mode also returns its success or fail indication to the JAM 76 after a request for adding a set of program files 74 or removing the already pre-internalized image 88.

It should be noted in both of the embodiments illustrated in FIG. 3 and FIG. 4 that the virtual machine's core components are being reused by the second mode or pre-internalization mode. As a result, the virtual machine is enhanced in the present invention to permit storage of images that have been fully translated to a memory resource address.

Figure 5:
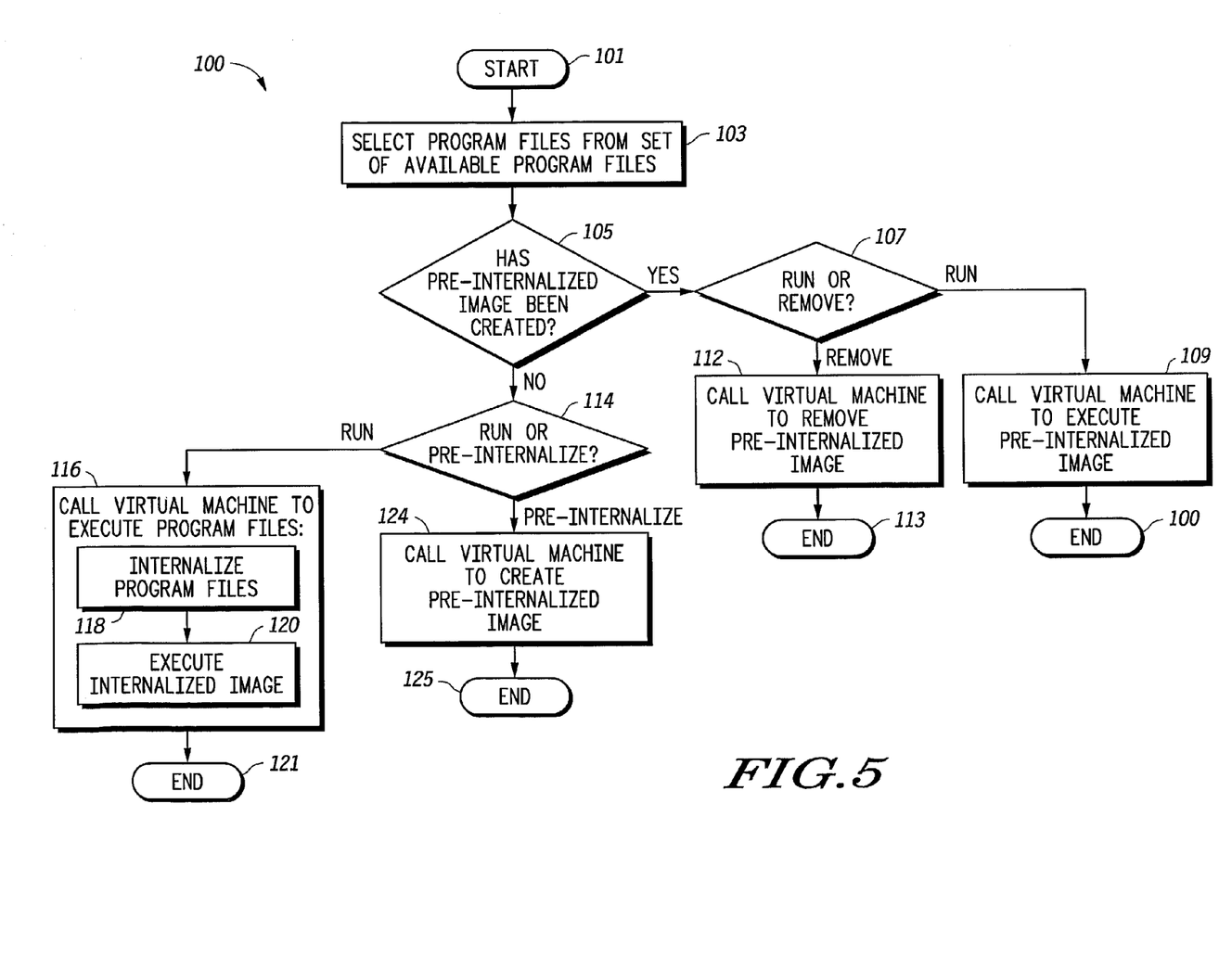
FIG. 5 illustrates in flowchart form a process for creating and processing pre-internalized files in accordance with the present invention.

Illustrated in FIG. 5 is a process 100 illustrating a variety of program application execution options for a Java application manager in association with a Virtual Machine. The process begins with a start step 101. In step 103 either a user or another source selects a program file from a set of available program files. The selected program files may or may not already be present in memory on the device in a pre-internalized image form. The set contains preloaded classes and/or pre-internalized images and/or program files external to the Virtual Machine. It should be understood that the processing of preloaded classes is not detailed in FIG. 5. In a step 105, a determination is made as to whether a pre-internalized application image has been previously created. If previously created, the image would be resident in permanent memory on the device containing the Virtual Machine. If the resulting answer to step 105 is 'yes', a step 107 provides two choices: (1) run the program files; or (2) to remove the program files from the pre-internalization space of permanent memory. In one form, a user request may be received from a user to elect which choice to make. Assume initially that either the user or other source elects to run the program files. Since the program files exist in the pre-internalization space of permanent memory, the Virtual Machine in normal mode is called by the Java application manager to execute the pre-internalized image in a step 109. Upon completion of execution, an end step 100 has been reached with respect to execution of the program file. Assume that the user or other source elects to remove the program file from permanent memory of the device containing the Virtual Machine. The Java application manager calls the Virtual Machine in the second mode to remove the pre-internalized image in a step 112. It should be noted that the removal of pre-internalized images is an additional function of the pre-internalizer when the Virtual Machine is operating in the pre-internalization mode. Upon removal, an end step 113 is reached. The Java application manager will also update the list of dynamically pre-internalized program files in permanent memory.

Returning to step 105, assume that no pre-internalization image of interest has previously occurred. If the resulting answer to step 105 is 'no', a step 114 provides two choices: (1) run the program files; or (2) add the program files to the pre-internalization space of permanent memory. In one implementation, the choice may be implemented in response to a user request to either run the program files or to enter the pre-internalization mode. Another embodiment may implement the choice with an automatic run routine. If a decision to run the program files is made by the user or other source, a step 116 is performed. It should be noted that the step 116 is consistent with execution of a non-pre-internalized program files that would be performed by the device in FIG. 2. Step 116 has a first step 118 in which the program files are internalized by the Virtual Machine when operating in the first or normal mode. Note that the pre-internalizer of the Virtual Machine is not used for this pre-internalization function. Rather, the Virtual Machine uses the various functional portions, such as the verifier, the resolver, etc., to perform the pre-internalization. In a step 120 the Virtual Machine executes the program files after internalization has occurred in step 118. A step 121 ends the execution of the program. It should be noted that because the program was not a stored pre-internalized image, the step 118 has to be performed every time that the program files are selected for execution. Returning to step 114, should the user or other source elect to pre-internalize the program files, a step 124 is performed rather than step 116. In step 124, the Java application manager calls the Virtual Machine in the second or pre-internalization mode to create a pre-internalized image in the manner described above for FIG. 3. Upon creation of the pre-internalized image, the image is stored in permanent memory of the device. It should be noted that step 124 does not need to be performed again should the program files be selected again for execution as step 105 would thereafter direct the process to step 107.

Figure 6:
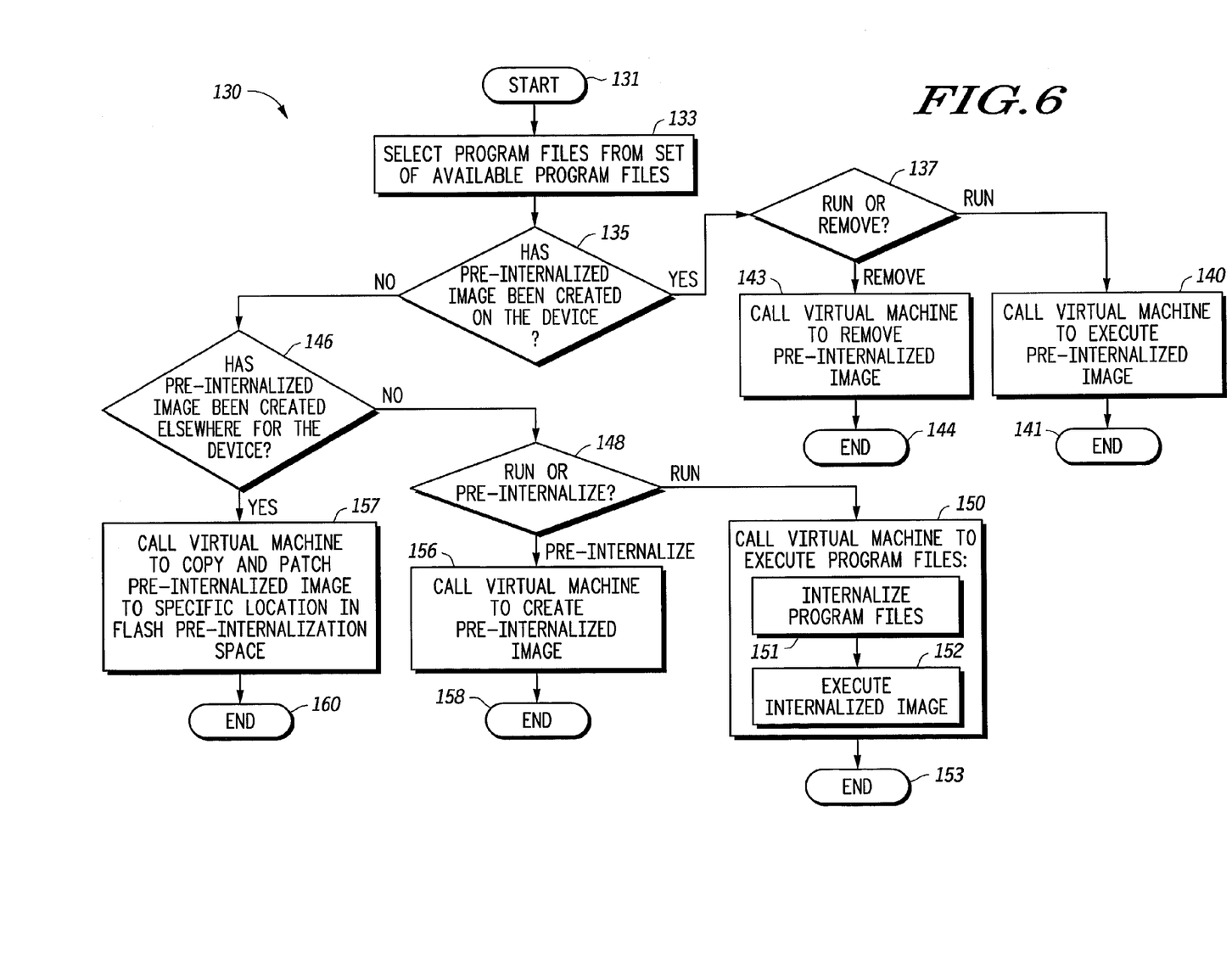
FIG. 6 illustrates in flowchart form a process for off-client creation and processing of pre-internalized files in accordance with the present invention.

Illustrated in FIG. 6 is an alternate embodiment process 130. Process 130 begins with a step 131. In a step 133, a user or other source selects one or more program files from a set of available program files. In one form, possible 'other sources' for this selection may include an off-device program file server or another off-device source. In a step 135, a decision is made as to whether a pre-internalized image has been created on the device. The reason the 'on the device' criteria has been added to step 135 is because this embodiment illustrates the situation of receiving an already pre-internalized image from an off-device source and how the pre-internalizer handles that case. If the answer is 'yes', then steps 137, 140, 141, 143 and 144 are exactly the same as steps 107, 109, 100, 112 and 113 of FIG. 5, respectively. Step 137 may be determined in response to a user request to either perform a run or a remove operation. If the answer is 'no', a step 146 is executed where a decision is made as to whether a pre-internalized image has been created elsewhere for the device. If the answer to this query is 'no', steps 148, 150, 151, 152, 153, 156 and 158 are exactly the same as steps 114, 116, 118, 120, 121, 124 and 125 of FIG. 5, respectively. Step 148 may be determined in response to a user request to either perform a run or a pre-internalize operation. If the answer to this query is 'yes', a step 157 is implemented. In step 157 the Virtual Machine is called by the Java Application Manager to not pre-internalize the image, but rather to only to copy and patch the pre-internalized image to a specific location in the device's permanent memory. Upon completion of step 157, an end step 160 is reached.

Figure 7:
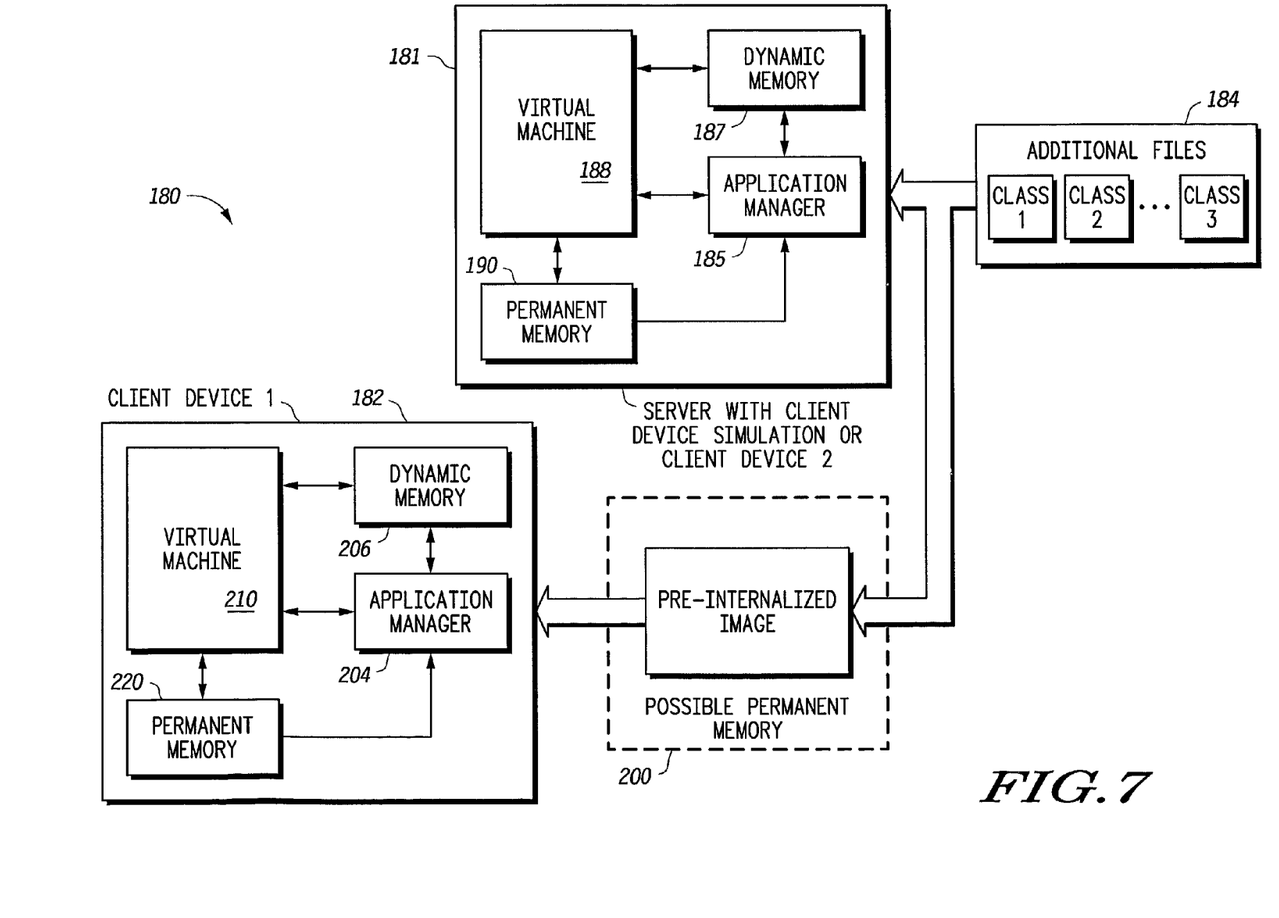
FIG. 7 illustrates in block diagram form a client/off-client system for implementing the flowchart of FIG. 6.

Reference to FIG. 7 will further illustrate the processing of images received from off-device sources. This embodiment addresses the need to further reduce the execution time of an application by significantly reducing the pre-installation time. In other words, the present invention may be implemented on a device that functions as a server. Therefore, advantage is made of running the Java Virtual Machine environment on an off-device server or on an off-device client (peer-to-peer) that is similar to the existing device. The difference from an off-device image and an image created by the device's Virtual Machine is where the image is stored within the device's memory resources.

A system 180 generally has a first client device 182, a second client device or server with client device simulation 181 and an application suite 184 that is not resident in a reusable executable image form on device 182. Client device 182 generally comprises an application manager 204, a dynamic memory 206, a permanent memory 220 and a virtual machine 210. In one form, the structure of devices 181 and 182 is the same as device 45 of FIG. 3. It should be apparent that alternate embodiments and modified structure could be created to perform the functionality taught herein. An optional storage device 200 in permanent memory outside of device 182 may be used to store pre-internalized images of additional files.

In operation, the additional files 184 are created by a source external to devices 181 and 182. The additional files 184 are brought into device or server with client device simulation 181 by its application manager 185. The additional files are pre-internalized into its permanent memory 190 by the Virtual Machine 188 operating in the second mode. Virtual Machine 188 utilizes dynamic memory 187 to support this mode. The stored image may or may not be executed by device 181. If device 181 is a client device, then it is likely that this application image will be executed by device 181. If device 181 is a server with client device simulation, then device 181 is used merely to create the pre-internalized image (i.e. device 181 functions as an application server). When device 181 is used as a server with client device simulation, the image is optionally stored in permanent memory 200 which can be located anywhere within system design choice. When application manager 204 of the first client device 182 receives the pre-internalized image from permanent memory 200 or from the application manager 185, then only the last step of pre-internalization must occur. The last step is step 157 of FIG. 6 and involves a copy and patch of the pre-internalized image to permanent memory 220. Therefore, it should be apparent that system 180 functions to enable device 182 to avoid the full pre-internalization processing steps. With low-end client devices that are extremely limited in processing power and dynamic memory size, the present invention enables low-end client devices to be capable to be configured with non-resident applications as compared to a stand-alone device. Additionally, the low-end client configuration taught herein is fast as compared to prior devices that perform the entire pre-internalization process every time a non-internalized program requires execution.

Figure 8:
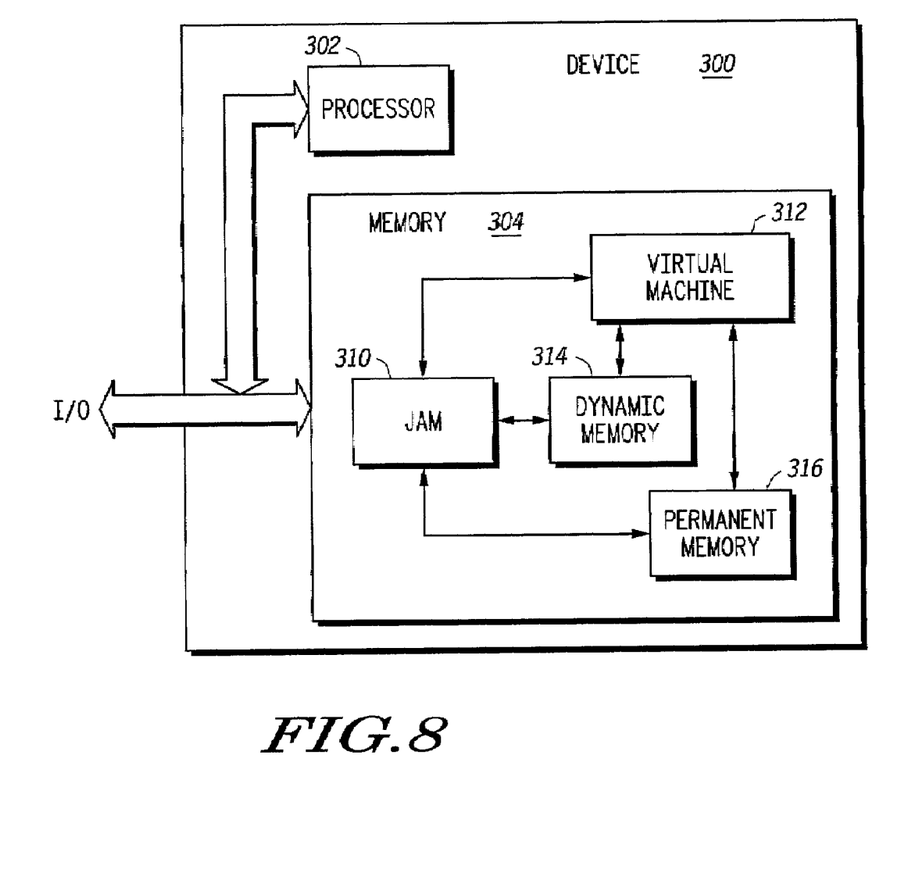
FIG. 8 illustrates in block diagram form an embodiment of a device in accordance with the present invention.

Illustrated in FIG. 8 is a device 300 that implements the present invention. Device 300 has a processor 302 and a memory 304. Memory 304 may be organized to have many different structures and FIG. 8 only illustrates a structure similar to that discussed in connection with the prior figures. An I/O is bi-directionally coupled to processor 302 and memory 304 which are also bi-directionally coupled. In the illustrated form memory 304 has a Java Application Manager 310, a Virtual Machine 312, a Dynamic Memory 314 and a permanent memory 316.

In operation, the processor executes predetermined instructions. A first portion of memory 304 is coupled to processor 302 for providing instructions and data to the processor. In one form, the first portion of memory 304 is the Virtual Machine 312. Memory 304 contains at least a first, a second and a third set of one or more instructions. Whether each set of the instruction sets to be discussed contains one or a plurality of instructions is a matter of design and programming choice and depends upon how much hardware functionality is desired versus software functionality. Solely for purposes of discussion, an assumption will be made in the following discussion regarding instruction functionality that a plurality of instructions will be used in order to minimize the hardware implementation. However, the instruction functionality to be described herein may be implemented with a single instruction if desired. The first plurality of instructions is for receiving a first program file. The second plurality of instructions is for pre-internalizing the first program file into the Virtual Machine's native memory structure to create a reusable executable image of the first program file. The third plurality of instructions is for storing the pre-internalized program file image or reusable executable image in a second memory portion within memory 304. The reusable executable image is capable of being executed by the Virtual Machine 312 without being internalized prior to execution.

Memory 304 of FIG. 8 may also include a fourth plurality of instructions for receiving and storing a reusable executable image in the memory. When the reusable executable image is stored, memory pointers are updated by a built-in mechanism to permit the images to be moved around within the same device memory. Therefore, the memory which stores reusable executable images is capable of dynamic memory reconciliation to effectively use memory storage and reconcile memory to efficiently use available addresses. This process permits objects to be moved on the device to create a second reusable executable image. After a reusable executable image is stored within a device, the memory addresses within the reusable executable image(s) are updated to reflect its present memory address. Memory 304 may also include a separate plurality of instructions which is executed when processing a user request wherein in response to the user request the virtual machine operates in the pre-internalization mode. A separate plurality of instructions may be in memory 304 for causing the transfer of the pre-internalized program file image from a second memory which may be either within or external to the device. Another plurality of instructions within memory 304 may implement the processing of a user request by either moving or totally removing a pre-internalized program file from memory.

The reusable executable image was previously created by pre-internalizing a program file into the Virtual Machine 312's native memory structure. In such an instantiation, the Virtual Machine 312 is capable of executing the reusable executable image without internalizing the reusable executable image prior to execution. The memory 304 may additionally store a separate plurality of instructions for moving the reusable executable image to a different location within the memory. Further, memory 304 may store another set of instructions that are capable of updating memory addresses within the reusable executable image or pre-internalized program file image. It should be understood that memory 304 also may store instructions which implement the process of each of FIG. 5 and FIG. 6.

The present invention is particularly advantageous to use in portable, wireless devices. Examples of the type of portable device that could implement the present invention include a diverse group such as a telephone, an internet appliance (portable and/or non-portable), a personal digital assistant (PDA), a pager, a camera, a camcorder (camera/recorder), a portable television, and products that combine various communication functions.

In the foregoing specification, the invention has been described with reference to Java programming language and specific embodiments. However, one of ordinary skill in the art appreciates that various modifications and changes can be made without departing from the scope of the present invention as set forth in the claims below. For example, the present invention is applicable to other high-level programming languages that enable dynamic loading. Also, the software taught herein (such as a software implementation of the Virtual Machine 50 of FIG. 3, for example) may be embodied on one or more of computer hard disks, floppy disks, 3.5" disks, computer storage tapes, magnetic drums, static random access memory (SRAM) cells, dynamic random access memory (DRAM) cells, electrically erasable (EEPROM, EPROM, Flash) cells, nonvolatile cells, ferroelectric or ferromagnetic memory, compact disks (CDs), laser disks, optical disks, and any like computer readable media. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A process for operating a virtual machine having a normal mode of operation and a pre-internalization mode of operation, comprising:

selecting a program file from a set of available program files to identify a selected program file;

determining whether a reusable pre-internalized image of the selected program file has been created, wherein the reusable pre-internalized image is capable of being executed without any further internalization of the selected program file prior to execution by any subsequent invocation of the virtual machine;

if a reusable pre-internalized image of the selected program file has not been created, selectively operating the virtual machine in the pre-internalization mode, comprising:

creating the reusable pre-internalized image of the selected program file; and storing the reusable pre-internalized image of the selected program file into a permanent memory, thereby avoiding subsequent internalization of the selected program file for all subsequent program executions;

and wherein the virtual machine executes within a first device and the process further comprises:

if the reusable pre-internalized image of the selected program file is available within the first device, executing the reusable pre-internalized image of the selected program file without internalizing the reusable pre-internalized image of the selected program file prior to execution, and if the reusable pre-internalized image of the selected program file is available within a second device, separate from the first device, entering the pre-internalization mode, copying the reusable pre-internalized image of the selected program file from the second device to the first device, and updating memory addresses within the reusable pre-internalized image of the selected program file.

2. The process of claim 1 further comprising:

if a reusable pre-internalized image of the selected program file has not been created, selectively operating the virtual machine in the pre-internalization mode is performed in response to a user request.

3. The process of claim 1 wherein if the reusable pre-internalized image of the selected program file has not been created, automatically operating the virtual machine in the pre-internalization mode.

4. The process of claim 1 further comprising:

executing the virtual machine within a first device; and if the reusable pre-internalized image of the selected program file is available within the first device, selectively entering the pre-internalization mode and removing the reusable pre-internalized image of the selected program file.

5. The process of claim 4 wherein selectively entering the pre-internalization mode is performed in response to a user request.

6. The process of claim 1 wherein the first device is a portable device.

7. The process of claim 6 wherein the portable device is selected from a group comprising a telephone, pager, internet appliance, personal digital assistant (PDA), camcorder, portable television, and camera.

8. A device capable of executing a virtual machine having a pre-internalization mode of operation, comprising:
   a processor for executing instructions;
   a permanent memory coupled to the processor for providing instructions and data to the processor, the permanent memory comprising the virtual machine, the virtual machine comprising:
   a first set of one or more instructions, the first set of one or more instructions when executed determining whether a pre-internalized image of a selected program file has been created, wherein the pre-internalized image of the selected program file is capable of being executed without any further internalization of the selected program file prior to execution by any subsequent invocation of the virtual machine;
   a second set of one or more instructions, the second set of one or more instructions when executed by the processor operating the virtual machine in the pre-internalization mode, wherein the second set of one or more instructions is executed if the pre-internalized image of the selected program file has not been created;
   a third set of one or more instructions, the third set of one or more instructions when executed by the processor creating the pre-internalized image of the selected program file, wherein the third set of one or more instructions corresponds to the pre-internalization mode of operation; and
   a fourth set of one or more instructions, the fourth set of one or more instructions when executed by the processor storing the pre-internalized image of the selected program file into the permanent memory, wherein the fourth set of one or more instructions correspond to the pre-internalization mode of operation.

9. The device of claim 8, wherein the virtual machine further comprises:
   a fifth set of one or more instructions, the fifth set of one or more instructions when executed by the processor processing a user request, wherein in response to the user request, the virtual machine operates in pre-internalization mode.

10. The device of claim 8, wherein the virtual machine further comprises:
    a fifth set of one or more instructions, the fifth set of one or more instructions when executed by the processor transferring the pre-internalized image of the selected program file from a second permanent memory; and
    a sixth set of one or more instructions, the sixth set of one or more instructions when executed by the processor updating memory addresses within the pre-internalized image of the selected program file, wherein execution of the fifth set of one or more instructions and the sixth set of one or more instructions corresponds to the pre-internalization mode of operation.

11. The device of claim 10 further comprising:
    a sixth set of one or more instructions, the sixth set of one or more instructions when executed by the processor updating memory addresses within the pre-internalized image of the selected program file, wherein execution of the fifth set of one or more instructions and the sixth set of one or more instructions corresponds to the pre-internalization mode of operation.

12. The device of claim 8, wherein the virtual machine further comprises:
    a fifth set of one or more instructions, the fifth set of one or more instructions when executed by the processor removing the pre-internalized image of the selected program file from the permanent memory.

13. The device of claim 12, wherein the virtual machine further comprises:
    a sixth set of one or more instructions, the sixth set of one or more instructions when executed by the processor processing a user request, wherein removing the pre-internalized image of the selected program file from the permanent memory is performed in response to the user request.

14. The device of claim 8, wherein the device is a portable device.

15. The device of claim 14, wherein the portable device is selected from a group comprising a telephone, pager, internet appliance, personal digital assistant (PDA), camcorder, portable television, and camera.

* * * * *